United States Patent [19]
Kaland

[11] 4,321,785
[45] Mar. 30, 1982

[54] WHEEL HEIGHT ADJUSTER

[75] Inventor: LaMont A. Kaland, Cedar Grove, Wis.

[73] Assignee: Ataco Steel Products Co., Grafton, Wis.

[21] Appl. No.: 213,901

[22] Filed: Dec. 8, 1980

[51] Int. Cl.³ .......................................... A01D 53/08
[52] U.S. Cl. .................................................. 56/17.2
[58] Field of Search .................. 56/17.2, 17.1; 280/43, 280/43.17

[56] References Cited

U.S. PATENT DOCUMENTS

| | | | |
|---|---|---|---|
| 952,815 | 3/1910 | Kissel | 280/43.17 |
| 2,915,318 | 12/1959 | Chesser | 56/17.2 |
| 2,976,050 | 3/1961 | Gbur | 280/43.17 |
| 3,147,987 | 9/1964 | Ritums | 56/17.2 |
| 3,462,171 | 8/1969 | Mitty et al. | 280/43 |
| 3,649,828 | 3/1972 | Prioe | 280/43.17 |
| 3,755,998 | 9/1973 | Hoffmeyer | 280/43 |

Primary Examiner—Paul J. Hirsch
Attorney, Agent, or Firm—James E. Nilles

[57] ABSTRACT

A wheel axle height adjusting mechanism for attachment to the housing of such as a lawnmower, the mechanism comprising a substantially flat fan plate pivotally attached to a substantially flat base plate. The fan plate has a fixed recessed portion embossed away from the base plate for maintaining therein a bore-containing element for receiving the wheel axle, and also has an arcuate end to which are adjacent a plurality of spaced-apart detents. The base plate has a second recessed portion embossed outwardly of the fan plate and is apertured to receive bolts for attaching the mechanism to the housing. A spring handle is attached to the base plate at one point and has thereon a finger selectively and releasably engageable with the detents. A fixed handle rigidly attached to the base plate cooperates with the spring handle to permit lateral, disengaging movement of the finger away from the detents. When the finger is disengaged from the detents, the fan plate is pivotable relative to the base plate.

9 Claims, 9 Drawing Figures

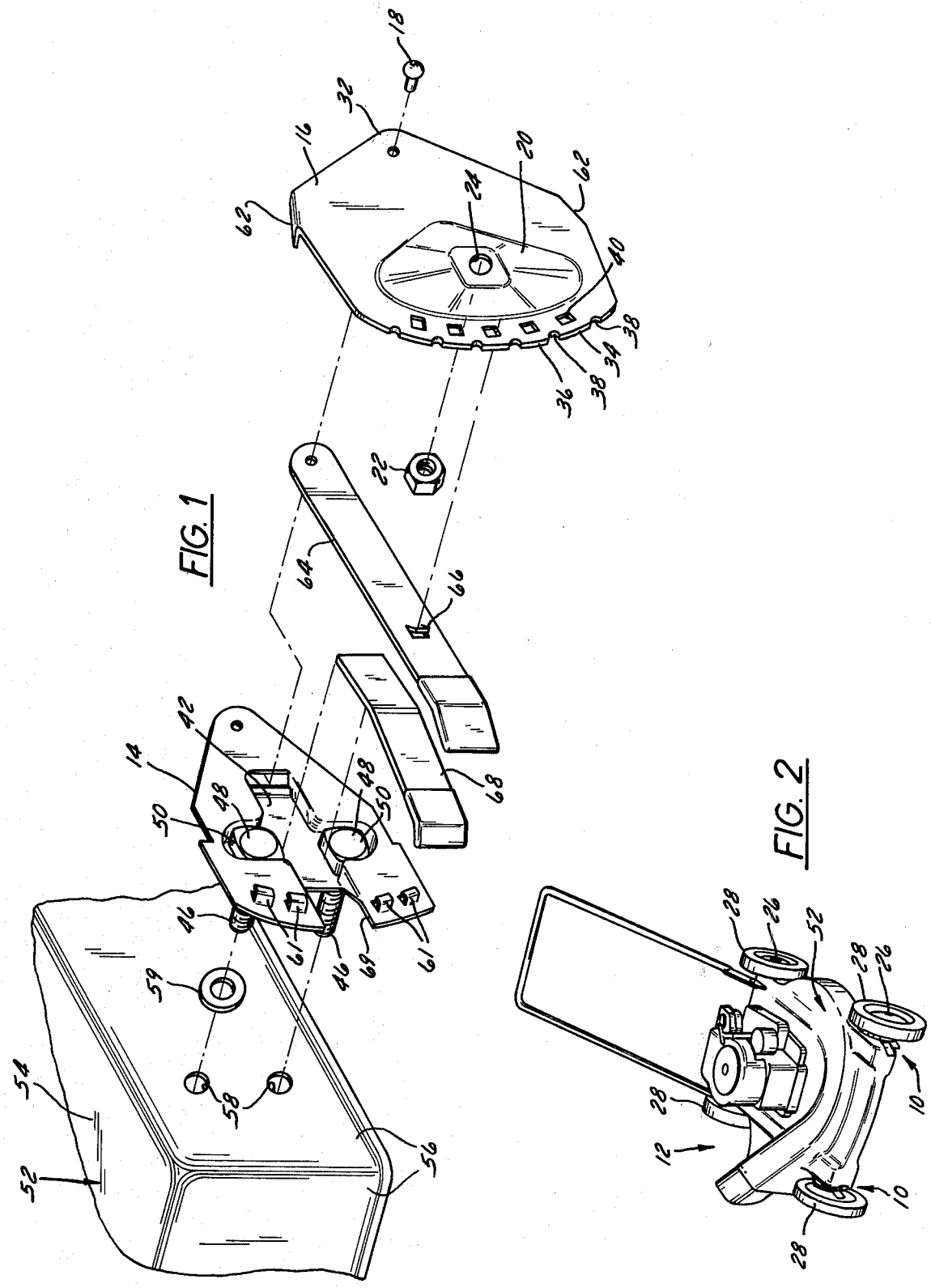

WHEEL HEIGHT ADJUSTER

BACKGROUND OF THE INVENTION

The invention relates to a wheel axle height adjusting mechanism for attachment to a machine housing, such as for example a lawnmower housing. Typically, such lawnmowers have a housing with a top wall and side walls projecting downwardly from the top wall, and also have a motor on the housing and rotatably attached by a vertical power shaft to a rotary blade, the latter being positioned beneath the top wall and in close proximity to the ground to enable grass cutting. By adjusting the wheel axle relative to the housing, changes in the position of the blade relative to the ground are effected. Upward relative movement of the axle brings the blade closer to the ground and permits cutting the grass to a shorter length, and downward relative movement of the axle has the opposite effect.

Wheel axle height adjusters are known in various forms, but have one or more problems making them unsuitable for use in certain applications. For example, the disclosure of U.S. Pat. No. 2,836,430, issued to Laugenbacker on May 27, 1958, whose wheel height adjuster includes a contacting surface or finger engageable on one of several notches or detents, states that the position of the housing relative to the ground is adjusted from a lower position to a higher position by placing a foot on the mower's wheel and lifting the housing, whereupon the contacting surface rides out of one notch and towards another. Grasping the mower housing, particularly the lower portion of a housing's side wall which is in close proximity to the potentially dangerous rotary blade, is obviously undesirable.

Other prior art wheel adjusters include those disclosed in U.S. Pat. No. 3,210,089, issued to Hoffman, et. al., on Oct. 5, 1965, and in the U.S. Pat. No. 4,006,580, issued to Kalleicher, on Feb. 8, 1977. Both disclose means by which the relative level of the wheel axle to the housing may be adjusted by grasping or pressing an element located adjacent the wheel and vertically above the top wall of the mower housing, rendering them unsuitable as wheel adjusters for various self-propelled mowers. For example, in mowers propelled by their front wheels, power from the motor is typically transmitted to a horizontal, rotatable power shaft directly above and parallel to an axis connecting the centers of the front wheels. The ends of this horizontal power shaft are located directly above the front wheels, and fixedly attached to each end of the shaft is a spur gear which is in meshing engagement with its corresponding wheel. As the horizontal power shaft is rotated by the motor, the spur gears at the end of the shaft rotate and in turn drive the front wheels. The horizontal power shaft and spur gears, being spaced above the top wall of the housing, would prevent safe and facile access to a wheel adjuster that is actuable from above that top wall and adjacent the wheel.

Other disadvantages of many existing wheel height adjusters include their lack of interchangeability. These adjusters are designed for either the left- or right-side wheels of a machine housing and cannot be used on the opposite side. This restriction on their use requires one who assembles such wheel height adjusters to a lawnmower to maintain two different parts, complicating stocking and ordering procedures. A still further disadvantage of several existing designs is the inability of the machine operator to know at a glance whether all of the wheel axles are adjusted to the same level relative to the housing. Non-uniformity of wheel axle level results in a rotary blade that is not parallel to the ground over which it rides and can cause the lawnmower to cut grass to a non-uniform height.

SUMMARY OF THE INVENTION

The invention is a wheel height adjusting mechanism for attachment to a machine housing, such as a lawnmower housing having a top wall and side walls projecting downwardly from the top wall. The mechanism comprises a substantially flat fan plate pivotally attached about a pivot point to a substantially flat base plate. The fan plate has a first recessed portion embossed outwardly of the base plate for maintaining a bore-containing element for receiving the wheel axle, and also has an arcuate end with its center of the radius of curvature at the pivot point. A plurality of notches are spaced along the perimeter of the arcuate end, the notches being exposed by pivotal movement of the fan plate relative to the base plate. The position of each wheel axle relative to the housing may be quickly determined by observing the number of visible notches. The fan plate also has a plurality of spaced-apart apertures or detents adjacent the arcuate end and on a path extending along a radius from the pivot point.

The base plate has a second recessed portion embossed outwardly of the fan plate and is apertured to receive bolts projecting from the second recessed portion for attaching the mechanism to the housing and adjacent any wheel on that housing. The base plate also has a plurality of L-shaped, lanced tabs overriding the arcuate end of the fan blade, which securely maintain the fan plate in close engagement with the base plate throughout the mechanism's entire range of adjustment.

A spring handle is attached to the base plate, as for example to the pivot point, and is pivotally movable with the base plate about the pivot point. The spring handle has a finger selectively and releasably engageable with the detents. The spring handle further cooperates with a fixed handle rigidly attached to the base plate as a double, pinch action handle-spring release combination to permit lateral, disengaging movement of the finger away from the detents without the machine operator needing to grasp the machine housing. When the finger is engaged with one of the detents, pivotal movement of the fan plate relative to the base plate is prevented. When the finger is disengaged from any of the detents, pivotal movement is permitted. A pair of stops or ears on the fan plate and turned inwardly towards the base plate prevents pivotal movement of the finger beyond the ends of the path formed by the detents.

An object of the invention described is to provide a wheel adjusting mechanism that may be safely adjusted. By permitting adjustment without the operator's grasping of the housing, the hands of the operator are not placed in danger of being injured by the rotary blade, which is in close proximity to the housing's side walls. A further object of the invention is the provision of a wheel adjusting mechanism suitable for use with self-propelled mowers. Changes in the relative position of the wheel axle and machine housing using the mechanism here described are made, for example, at a position forward of the front wheel and below the top wall of the machine housing, eliminating any interference between the mechanism and front wheel drive transmission components.

A still further object of the invention is a wheel adjustment mechanism that may be mounted on either the left or right side of the machine housing. Another object of the invention is a wheel adjustment mechanism that indicates at a glance the level at which each wheel axle is set relative to the housing, permitting reliable setting of the rotary blade to a desired uniform height.

BRIEF DESCRIPTION OF THE DRAWINGS

FIG. 1 is a perspective view of a wheel adjusting mechanism in accordance with the present invention;

FIG. 2 is a perspective view of a lawn mower equipped with the wheel adjusting mechanism according to the invention;

DESCRIPTION OF A PREFERRED EMBODIMENT

Figure 5:
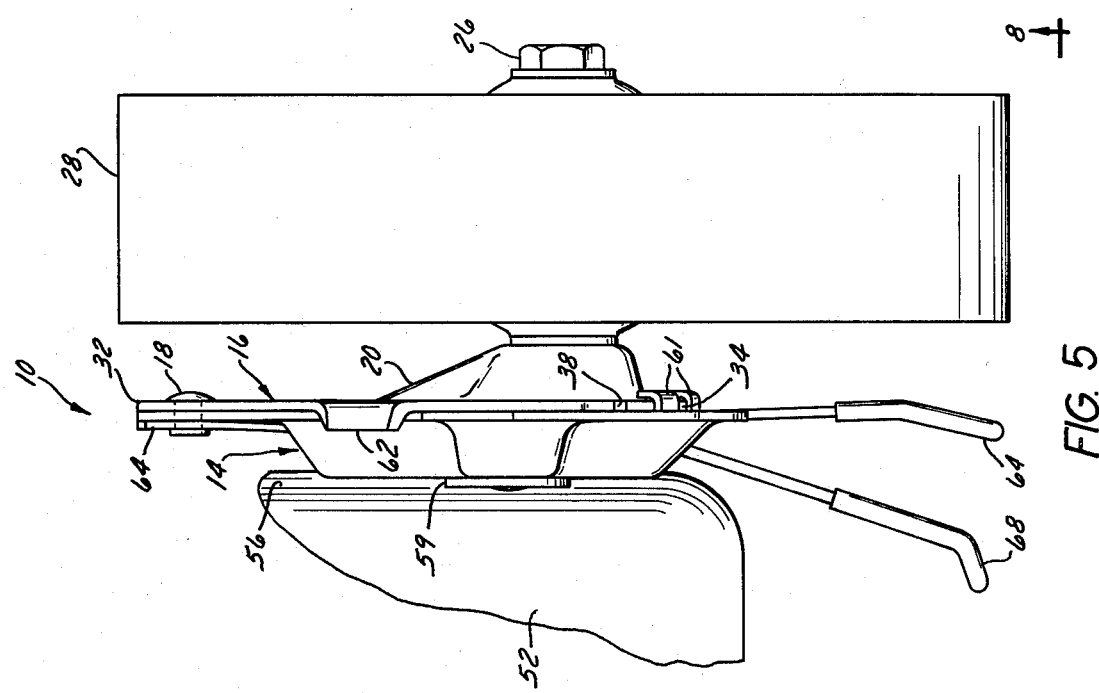
FIG. 5 is a top fragmentary view of the wheel adjusting mechanism mounted on the lawn mower and taken along line 5—5 of Fig. 3.
Figure 9:
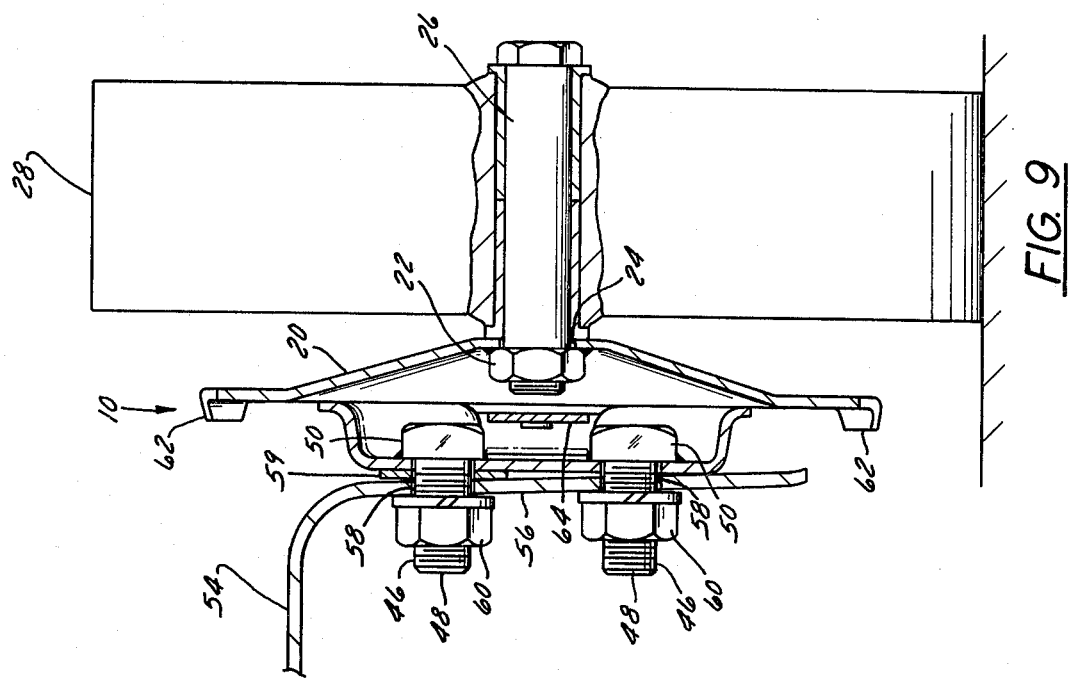
FIG. 9 is a front, fragmentary, sectional view of the wheel adjusting mechanism of FIG. 8.
Figure 8:
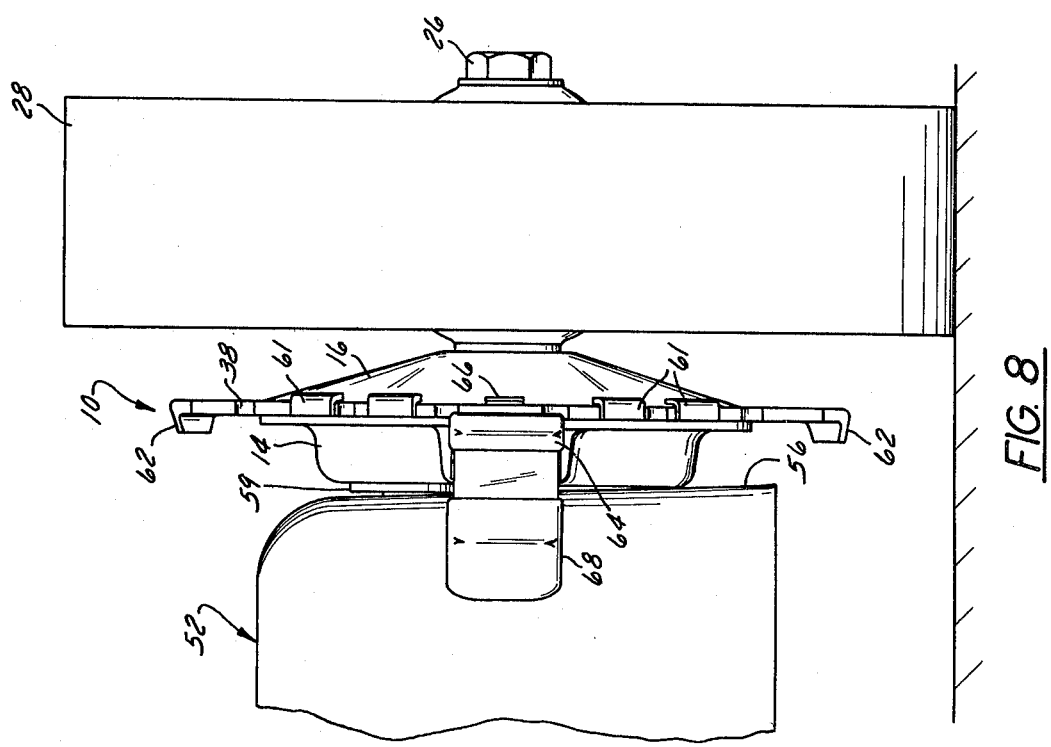
FIG. 8 is a front fragmentary view of the wheel adjusting mechanism mounted on the lawnmower and taken along line 8—8 of FIG. 5.

The wheel axle height adjusting mechanism 10 in accordance with the invention is shown in FIG. 1, and may be seen attached to a lawnmower 12 in FIG. 2. The mechanism includes a base plate 14 that is substantially flat and which is pivotally attached to a substantially flat fan plate 16 about a pivot point as by rivet 18. The substantially flat portions of the base and fan plates face one another and slide upon one another when pivoting. The fan plate is preferably stamped out of plated, rustproof sheet steel and has a first recessed portion embossed outwardly relative to the attached base plate, as shown in FIG. 5. The first recessed portion has a bore-containing element, such as a lock nut 22, rigidly attached as by welding to its base plate-facing side. An orifice 24 in the first recessed portion and whose axis is concentric with that of the lock nut permits wheel axle 26 with threaded ends to be threadably engaged at one end to lock nut 22. Wheel 28 rotates about axle shoulder bolt 26.

Figure 3:
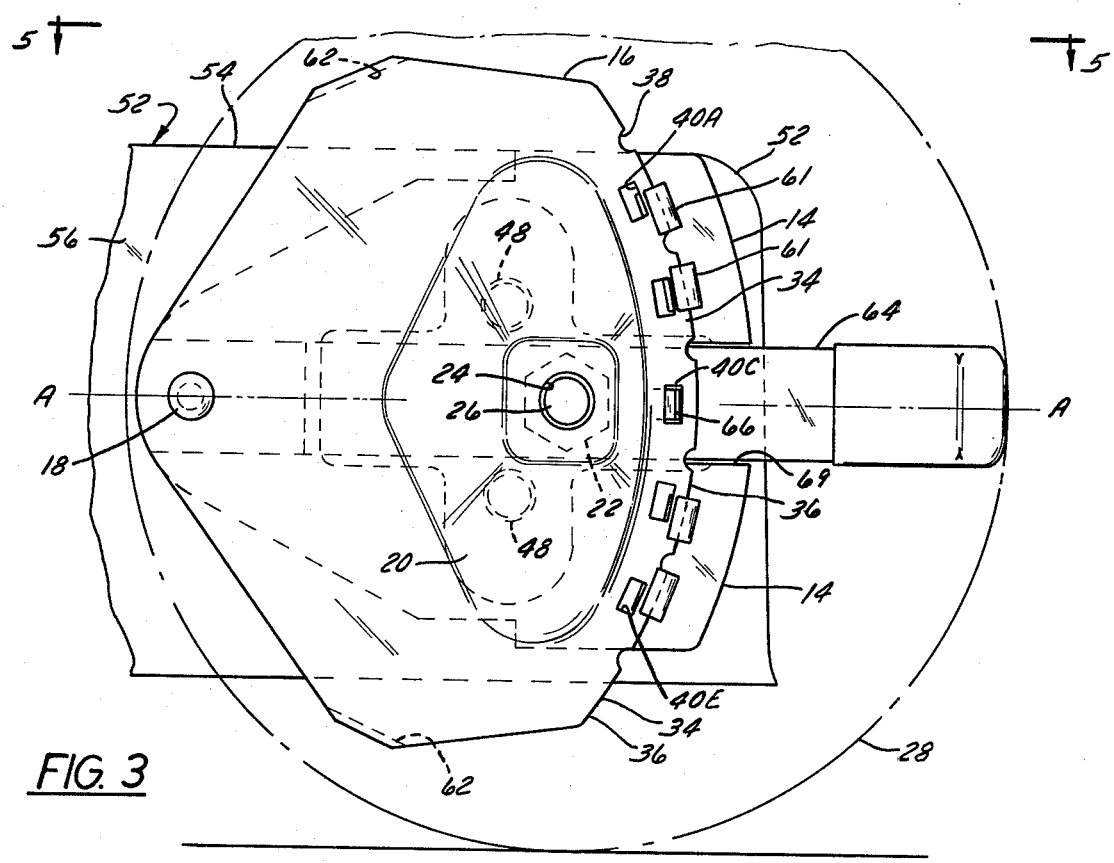
FIG. 3 is a side elevational view of the wheel adjusting mechanism mounted on the lawn mower of FIG. 2, but on an enlarged scale, and with the wheel shown in phantom.

Opposite the end of the fan plate 16 adjacent the pivot point, or pivot end 32, is the arcuate end 34 (FIG. 3). An arc 36 comprises the periphery of the arcuate end 34. In this embodiment, the pivot point or rivet 18 is at the center of the radius of curvature of the arc 36. A plurality of semi-circular notches 38 are provided along the arc 36 or periphery of the arcuate end 34, and are used to ensure uniformity of all four wheel axles with respect to the lawnmower housing, as will be explained below.

The fan plate 16 has a plurality of spaced apart apertures or detents 40 adjacent its arcuate end 34. The detents 40 in this embodiment are on a path extending along a radius from the pivot point 18, that is, each of the detents 40 is equidistant from the rivet.

Figure 4:
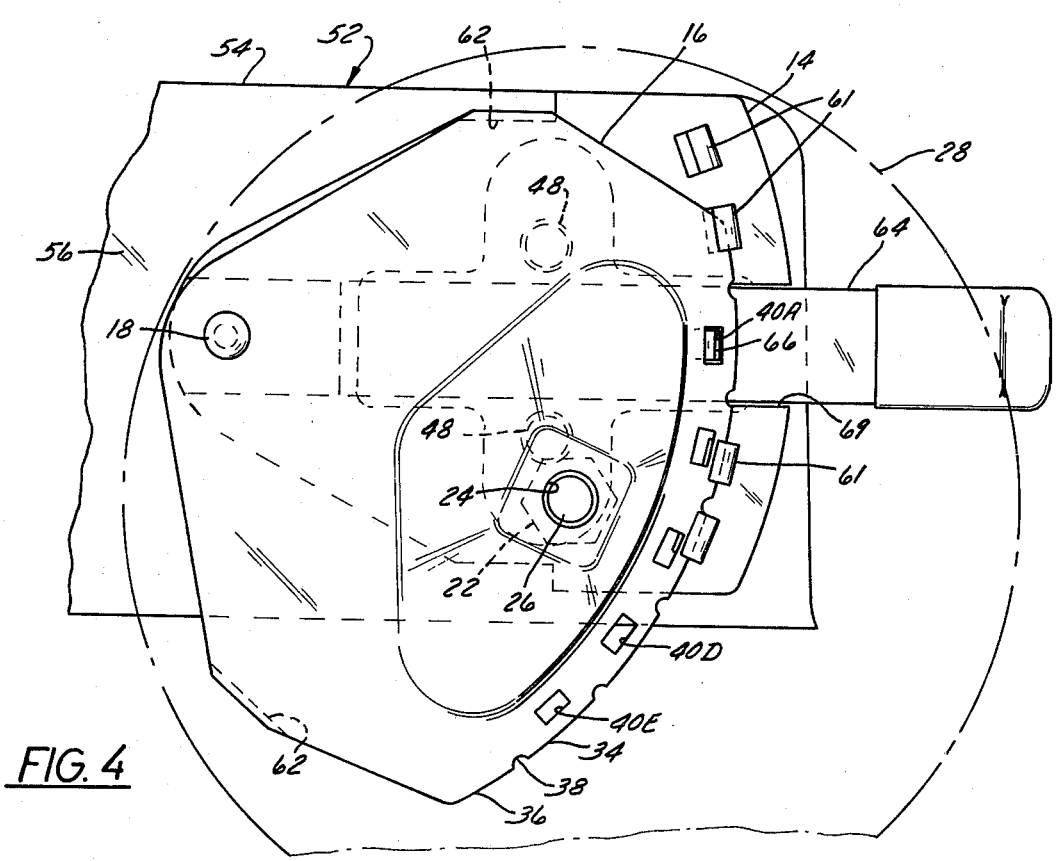
FIG. 4 is a view of the mechanism shown in FIG. 3, but with the fan plate pivoted downwardly relative to the base plate so that the wheel axle is located relative lower to the housing than in FIG. 3.

The substantially flat base plate 14 has a second recessed portion 42, which is embossed outwardly of the adjacent fan plate 16, and is also fabricated by stamping a plated, rustproof metal. A pair of holes 44 in the second recessed portion permits protrusion of the threaded stems 46 of a pair of bolts 48. The heads 50 of the bolts 48 are fixedly attached as by M.I.G. welding, to the fan plate-facing side of second recessed portion 42. The lawnmower 12 includes a housing 52 having a top wall 54 and a plurality of downwardly-extending side walls 56. A pair of mounting holes 58 in the side walls adjacent each of the corners of the housing to which a wheel 28 will be attached permit attachment of the mechanism 10 to the lawnmower. Stems 46 extend through mounting holes 58 and are secured to the side wall 56 with nuts 60. Because the side wall 56 is often angled slightly outwardly from the top wall relative to the vertical, a plain flat washer 59 is placed on the uppermost of the bolts 48 between second recessed portion 42 and side wall 56 to ensure that the mechanism 10 and the wheel 28 attached thereto are vertically oriented. The mechanism 10 is symmetrical on either side of line A—A in FIG. 3. This symmetry enables one to attach the mechanism to either the right or left side of the housing 52. In FIGS. 3 and 4, the mechanism 10 is shown attached to the right side of a mower housing 52, while FIGS. 5—9 depict the mechanism attached to the housing's left side. To switch a mechanism 10 from a right-hand to a left-hand mounting, the mechanism need merely be rotated 180° about its axis A—A.

The base plate 14 also has a plurality of L-shaped, lanced on struck-out tabs 61 which override the arcuate end of the fan blade. The tabs 61 are angled inwardly and towards the fan plate 16 and slidably engage the arc 36 and arcuate end 34, as may be seen in FIG. 8. The tabs 61 in this close, slidable engagement slide along the arcuate end 34 as the fan plate is pivoted about the base plate through the entire range of mechanism adjustment, ensuring a strong and secure mechanism. The fan plate 16 has a pair of ears or stops 62 turned inwardly towards the base plate 14 and for limiting pivotal travel of the latter, as will be explained below.

Figure 7:
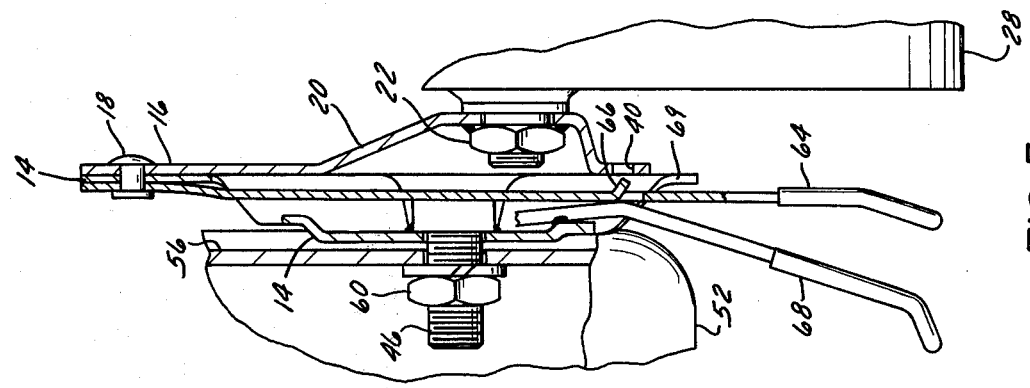
FIG. 7 is a top, fragmentary, sectional view of the wheel adjusting mechanism of FIG. 5, and showing the finger on the spring handle disengaged from any of the detents on the fan plate.
Figure 6:
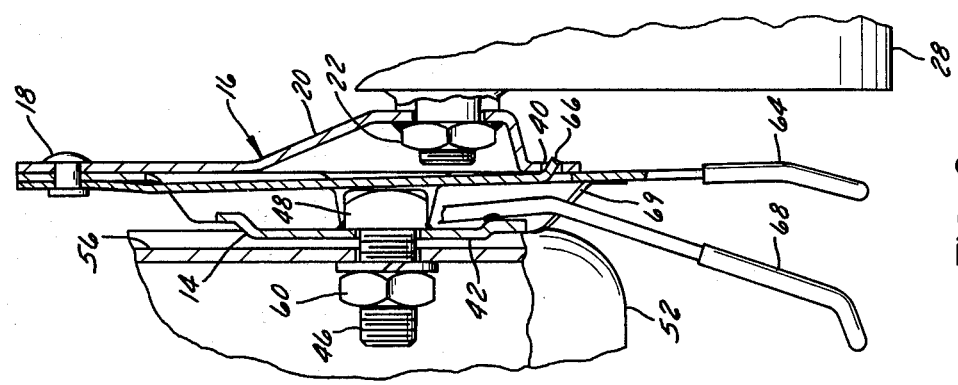
FIG. 6 is a top fragmentary, sectional view of the wheel adjusting mechanism of FIG. 5 and showing the finger on the spring handle engaging one of the detents on the fun plate.

A spring handle 64, preferably comprised of a spring steel, is attached to the base plate 14 at one point. In this embodiment, the spring handle is attached at the pivot point and is also captively held within second recessed portion 42 (FIGS 1, 6, and 7). This captive mounting in the second recessed portion and at the pivot point ensures that the spring handle 64 does not pivot but remains stationary with the base plate as the fan plate pivots relative to the base plate. Spring handle 64 has a finger 66 thereon, which may comprise a struck-out tab-like element as may be seen in FIGS. 6 and 7, for engaging one of the detents 40 on the fan plate and to thereby prevent pivotal movement of the fan plate relative to the base plate. A fixed handle 68 is rigidly attached to the base plate 14, and is positioned alongside and cooperates with spring handle 64 to permit lateral, disengaging movement of the finger 66 away from the detents 40. For example, in FIG. 6, the spring handle 64 is seen in its normal position, and the finger 66 is engaged with one of the detents 40. FIG. 7, however, shows the finger 66 moved laterally away from the detent 40. To move the finger away from the detent, one grasps spring handle 64 and fixed handle 68, as with the thumb and forefinger, respectively, and pushes on them inwardly towards one another. Fixed handle 68 is rigidly mounted to base plate 14 and does not move, but spring handle 64, mounted only at pivot point 18, is guidably moved along slot 69 in second recessed portion 42 towards fixed handle 68 and pulls the finger out of the detent, permitting pivotal movement of the fan plate about the base plate. When the finger 66 is adjacent another detent corresponding to the desired level of the wheel 28 relative to the housing 52, the spring handle 64 and fixed handle 68 are released, and the finger engages the new detent to ensure that the wheel remains at the desired level. With the mechanism described, an operator need never place his hand under the mower housing in proximity to the rotary blade.

In the mechanism described in this embodiment, the fan plate has five detents (FIGS. 3 and 4). The fan plate cannot be pivoted no more then is necessary for the finger 66 to engage one of the five detents 40. Thus, the pair of ears 62 on the fan plate 16 engage the base plate 14 to prevent further pivotal movement of the former when the finger is adjacent to either detent 40A or 40E.

Operation of the mechanism is simple and may be best understood by reference to FIGS. 3 and 4. In FIG. 3, the finger 66 engages detent 40C and the housing 52 and the rotary blade contained in the housing are in an intermediate position relative to the ground. If it is desired that grass to be cut be left at a longer length than would be permitted by the lawnmower of FIG. 3, the blade must be raised relative to the ground by lowering the wheel relative to the housing 12. To do this, the spring 64 and fixed handle 68 are grasped with one hand and the wheel 28 with the other. The handles 64 and 68 are pushed inwardly towards one another, releasing finger 66 from detent 40C. Wheel 28 is pushed downwardly and moves fan plate 16 to which it is attached pivotally about base plate 14 until finger 66 is adjacent detent 40A, at which point the upper ear 62 also abuts the base plate and prevents further pivotal movement of the fan plate 16. The handles 64 and 68 are released, permitting finger 66 to engage detent 40A. The grass may be cut to an increasingly shorter length by moving the finger to engage detents 40B-40E, respectively.

The number of notches 38 exposed enables an operator to ensure at a glance that all wheels 28 are at the same level relative to the housing 52. For example, in FIG. 3, three notches 38 are visible at or higher than the level of the upper edge of spring handle 64, indicating that the finger is in the third notch 40C from the top of fan plate 16. In FIG. 4, one notch is visible at or higher than the level of the upper edge of spring handle 64, indicating that the finger 66 is in the first notch 40A from the top of fan plate 16.

What I claim is:

1. A wheel height adjusting mechanism for attachment to the left or right side of a machine housing, comprising a base plate and a fan plate pivotally attached thereto about a pivot point, said fan plate being substantially flat and having a wheel journalled thereon, said fan plate further having an arcuate end, and also having a plurality of spaced-apart detents adjacent said arcuate end, said base plate being substantially flat and having means for attaching said mechanism to said housing; a flat resilient spring handle non-rotatably attached to said base plate at one point and having thereon a finger selectively and releasably engageable with said detents, said base plate further having a fixed handle rigidly attached to said base plate and positioned alongside in cooperative relationship with said spring handle to permit lateral, disengaging movement of said finger away from said detents when said spring handle is urged toward said fixed handle, said fan plate being pivotable relative to said base plate upon grasping of said wheel when said finger is disengaged from said detents.

2. The mechanism set forth in claim 1, wherein said base plate further comprises a plurality of L-shaped, lanced tabs overriding said arcuate end of said fan blade.

3. The mechanism set forth in claim 1, wherein said detents are located on a path extending along a radius from said pivot point.

4. The mechanism set forth in claim 2, wherein said detents are located on a path extending along a radius from said pivot point.

5. The mechanism set forth in claim 1, wherein said fan plate further comprises a pair of stops turned inwardly towards said base plate for abutting said base plate and thereby preventing pivotal movement of said finger beyond the ends of said path formed by said detents.

6. The mechanism set forth in claim 2, wherein said fan plate further comprises a pair of stops turned inwardly towards said base plate for abutting said base plate and thereby preventing pivotal movement of said finger beyond the ends of said path formed by said detents.

7. The mechanism set forth in claim 3, wherein said fan plate further comprises a pair of stops turned inwardly towards said base plate for abutting said base plate and thereby preventing pivotal movement of said finger beyond the ends of said path formed by said detents.

8. The mechanism set forth in claim 4, wherein said fan plate further comprises a pair of stops turned inwardly towards said base plate for abutting said base plate and thereby preventing pivotal movement of said finger beyond the ends of said path formed by said detents.

9. In a lawn mower, the combination comprising a housing having a top wall and side walls projecting downwardly from said top wall; and further comprising a wheel axle height adjusting mechanism for attachment to a machine housing, said mechanism comprising a base plate and a fan plate pivotally attached thereto about a pivot point, said fan plate being substantially flat and having a first recessed portion embossed outwardly of said base plate, said first recessed portion having a bore-containing element for receiving said wheel axle, said fan plate further having an arcuate end with its center of the radius of curvature at said pivot point, said arcuate end having a plurality of notches therealong, said notches being exposed by pivotally moving said fan plate on said base plate, the height of said wheel axle relative to said housing being indicated by the number of said notches being visible, and said fan plate also having a plurality of spaced-apart detents adjacent said arcuate end and on a path extending along a radius from said pivot point; said base plate being substantially flat and having a second recessed portion embossed outwardly of said fan plate and being apertured to receive bolts projecting from said second recessed portion for attaching said mechanism to said housing, said second recessed portion and bolts permitting interchangeable mounting of said mechanism to any wheel of said housing; said base plate having a plurality of L-shaped, lanced tabs overriding the arcuate end of said fan blade; a spring handle attached to said pivot point and pivotally movable about said pivot point with said base plate and having thereon a finger selectively and releasably engageable with said detents, said base plate further having a fixed handle rigidly attached to said base plate and cooperative with said spring handle to permit lateral, disengaging movement of said finger away from said detents without grasping said machine housing, said fan plate being pivotable relative to said base plate when said finger is disengaged from said detents, and said fan plate having a pair of stops turned inwardly towards said base plate for abutting said base plate and thereby preventing relative movement of said finger beyond the ends of said path formed by said detents.

* * * * *